July 14, 1936.  E. G. STAUDE  2,047,898
POWER AMPLIFYING DEVICE
Filed June 6, 1932  6 Sheets-Sheet 1
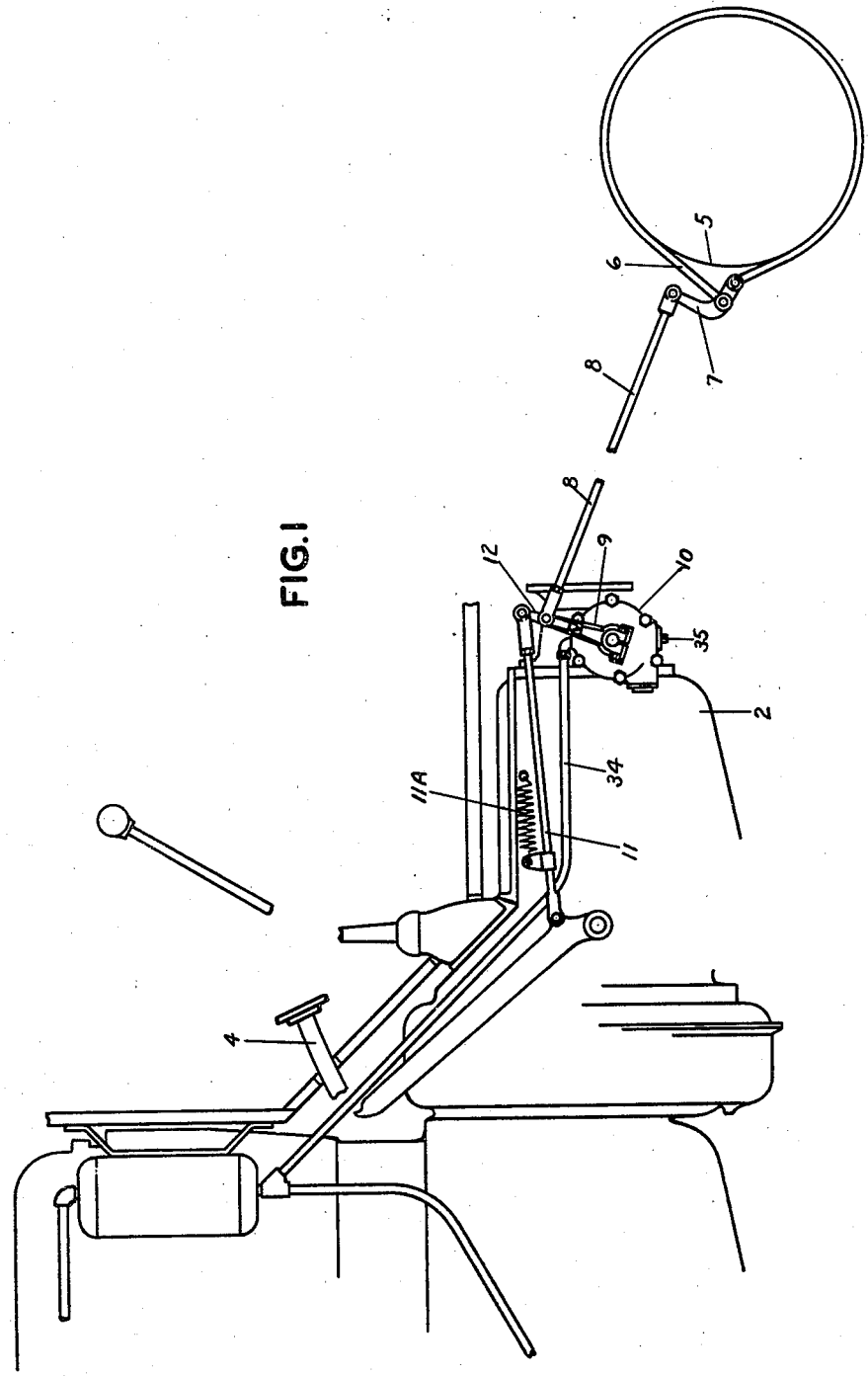
INVENTOR
EDWIN G. STAUDE
BY Paul, Paul & Moore
ATTORNEYS

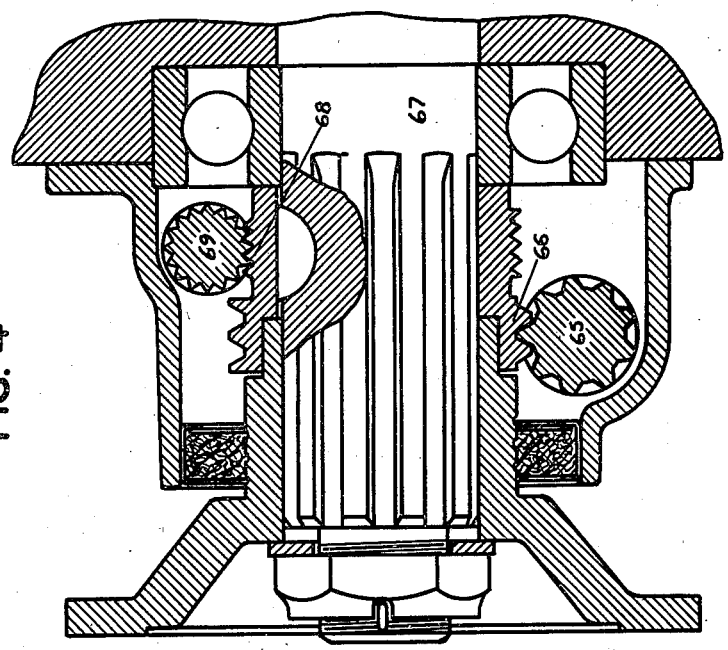
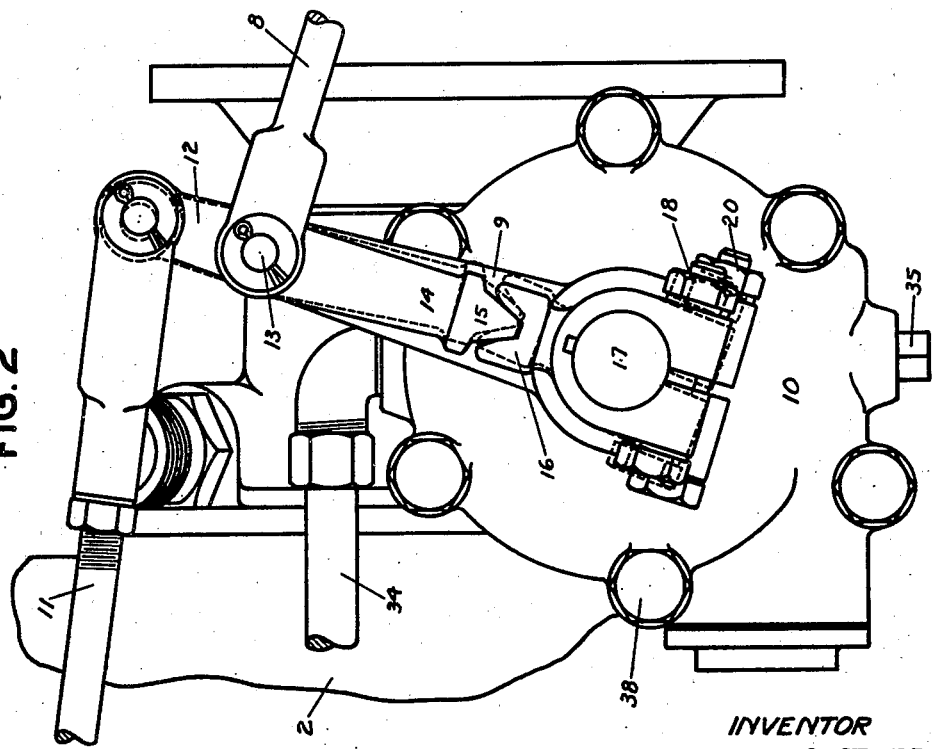

July 14, 1936.　　　E. G. STAUDE　　　2,047,898
POWER AMPLIFYING DEVICE
Filed June 6, 1932　　　6 Sheets-Sheet 3

INVENTOR
EDWIN G. STAUDE
BY Paul, Paul Moore
ATTORNEYS

July 14, 1936.  E. G. STAUDE  2,047,898
POWER AMPLIFYING DEVICE
Filed June 6, 1932  6 Sheets-Sheet 4
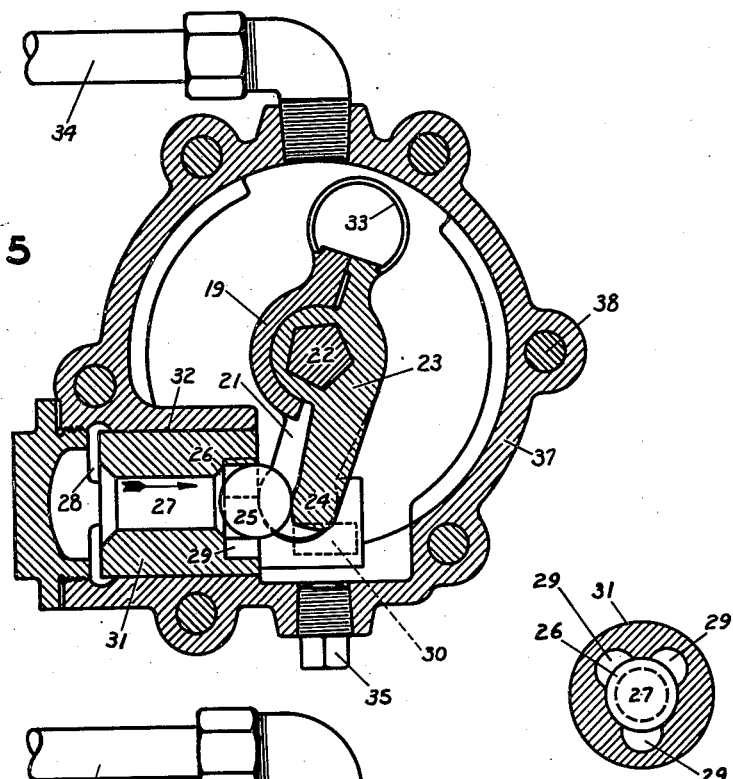
FIG. 5
FIG. 7
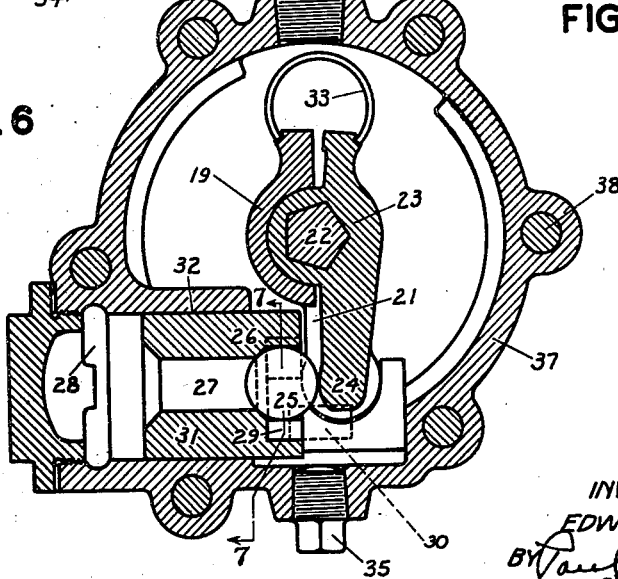
FIG. 6
INVENTOR
EDWIN G. STAUDE
BY *Paul Paul Wilson*
ATTORNEYS

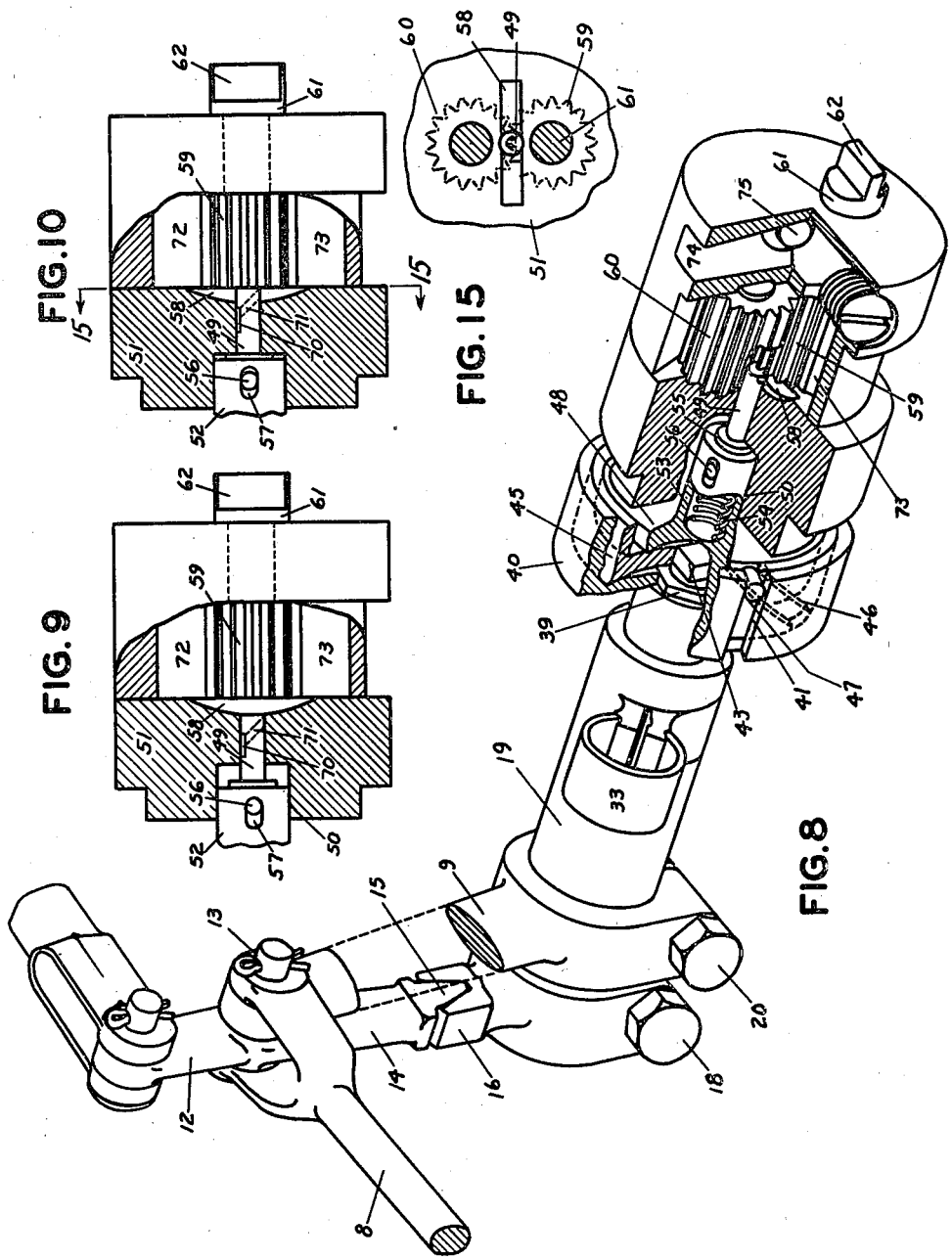

July 14, 1936.　　　　　E. G. STAUDE　　　　　2,047,898
POWER AMPLIFYING DEVICE
Filed June 6, 1932　　　　　6 Sheets-Sheet 6

INVENTOR
EDWIN G. STAUDE
BY Paul Paul Moore
ATTORNEYS

Patented July 14, 1936

2,047,898

UNITED STATES PATENT OFFICE 2,047,898

POWER AMPLIFYING DEVICE

Edwin G. Staude, Minneapolis, Minn.

Application June 6, 1932, Serial No. 615,820

36 Claims. (Cl. 188—152)

This invention relates generally to improvements in power amplifying devices, and provides a device applicable for operating brakes, clutches, steering gears and other motor car control devices, or any other type of control.

This invention is related to my copending applications, Serial Numbers 615,622 and 615,621, each filed June 6, 1932, respectively for improvements in Pumps and in power amplifying devices.

An important object of my present invention is to provide means for instantly and automatically reducing the volume of the fluid circulating pump when the full volume is not required. The invention finds valuable application in conjunction with auxiliary power devices for automobiles in which the pump is constantly driven, for example for use with brakes or clutches to reduce the volume of circulation when brake or clutch application is not desired. The attempt has heretofore been made to obtain this result by the use of a valve located on the intake side of the pump, but this device causes a serious "lag" or "delay" in pumping action due to the creation of a vacuum in the circulation line, to which fluid must be supplied before full pumping pressure is available.

Features of the invention include all details of construction illustrated, along with the broader ideas of means inherent in the disclosure.

It is, therefore, an important object of my present invention to provide means wherein the "lag" or "delay" is entirely eliminated, due to the fact that no vacuum is established. In this embodiment, a nominal continuous circulation is maintained by the process of breaking the "pumping seal" at the point where the pressure is created. By this means, heat due to friction is reduced to the minimum. Owing to the large volume of fluid in continuous circulation at high car speeds, the amount of heat generated has presented serious objections to the use of this general type of power amplifier. There is no limitation intended, however, by the statement that there is a nominal, continuous circulation maintained, because the important feature is the use of an element which is movable with respect to the pumping means, to instantly render such means inoperative, or operative, as required, and in such manner as to conserve power, and avoid generation of heat.

Tests have proven that in the practice of this invention, as applied in a braking system, there is no "lag" or "delay" when the brakes are being applied, and it has been further proven that the circulation pressure is instantly reduced more than eighty per cent, directly on release of the brakes, and motion of the volume control means in appropriate manner. Therefore, danger from overheating due to continuous full volume circulation has been entirely eliminated. Moreover, it has been found that as the pump gears continue to operate, after the volume control device has been operated to reduce the circulation pressure, there is no noise whatever as a result of the free flow of fluid around the pump gears.

Among the features of the invention are: all details of construction shown; the specific manner of axially translating the volume control member; the manner of so controlling said member as a result of rotative motion of the foot lever control shaft; the assembly scheme of the pump; the assembly scheme of the pump block and flow control means; broadly the scheme for operating the flow control means in a predetermined relation to the brake control means; the provision of a unit which is applied by insertion into the casing; the provision of a casing extending laterally from the transmission case for the reception of the unit by insertion; the utilization and arrangement of circulating passages in a cover element which can be bolted in operative position relative to the flow control device; the telescopic relations of certain of the parts facilitating assembly and driving connection; the broad idea of means for controlling flow which is movable independently of the pumping elements of the pump; and specifically the arrangement of the flow control means at the pitch line of the gear of a gear pump.

Objects, features and advantages of the invention will be set forth in the description of the drawings forming a part of this application, and in said drawings Figure 1 is a somewhat diagrammatic side elevation showing one embodiment of the invention, as applied to the braking system of an automobile;

Figure 2 is a full size end view of the power amplifying unit showing the brake rod and the pedal connecting rod;

Figure 4 is a vertical longitudinal section approximately on line 4—4 of Figure 3, illustrating the conventional type of transmission, and illustrating the cross drive power take-off shaft for driving the pump gear of the brake power amplifier;

Figure 5 is a cross-section on line 5—5 of Figure 3 illustrating the connection between the brake rod arm and the piston member, and illustrating the fluid circuit obstructing means and how it is operable by the brake pedal arm, with the parts in normal position as when the brakes are released;

Figure 6 is a view similar to Figure 5 with the fluid circuit obstructing means positioned as in extreme brake applying position;

Figure 7 is a detail section on line 7—7 of Figure 6, illustrating the ball valve and its relation to the fluid circuit, and showing how the ball is guided, and illustrating now provision is made for the escape of fluid at three points around the ball when unseated;

Figure 8 is a detail sectional perspective illustrating the volume control means and its control connections with the brake rod arm and with the brake pedal arm;

Figure 9 is a horizontal section showing the volume control means in "out" or "open" position, opening the by-pass across a line intersecting the gear centers at the pitch line, and permitting fluid to flow freely from the exhaust to the intake side;

Figure 10 is a view similar to Figure 9 with the volume control shown in "in" or "closed" position, conditioning the pump for full pressure operation;

Figure 3:
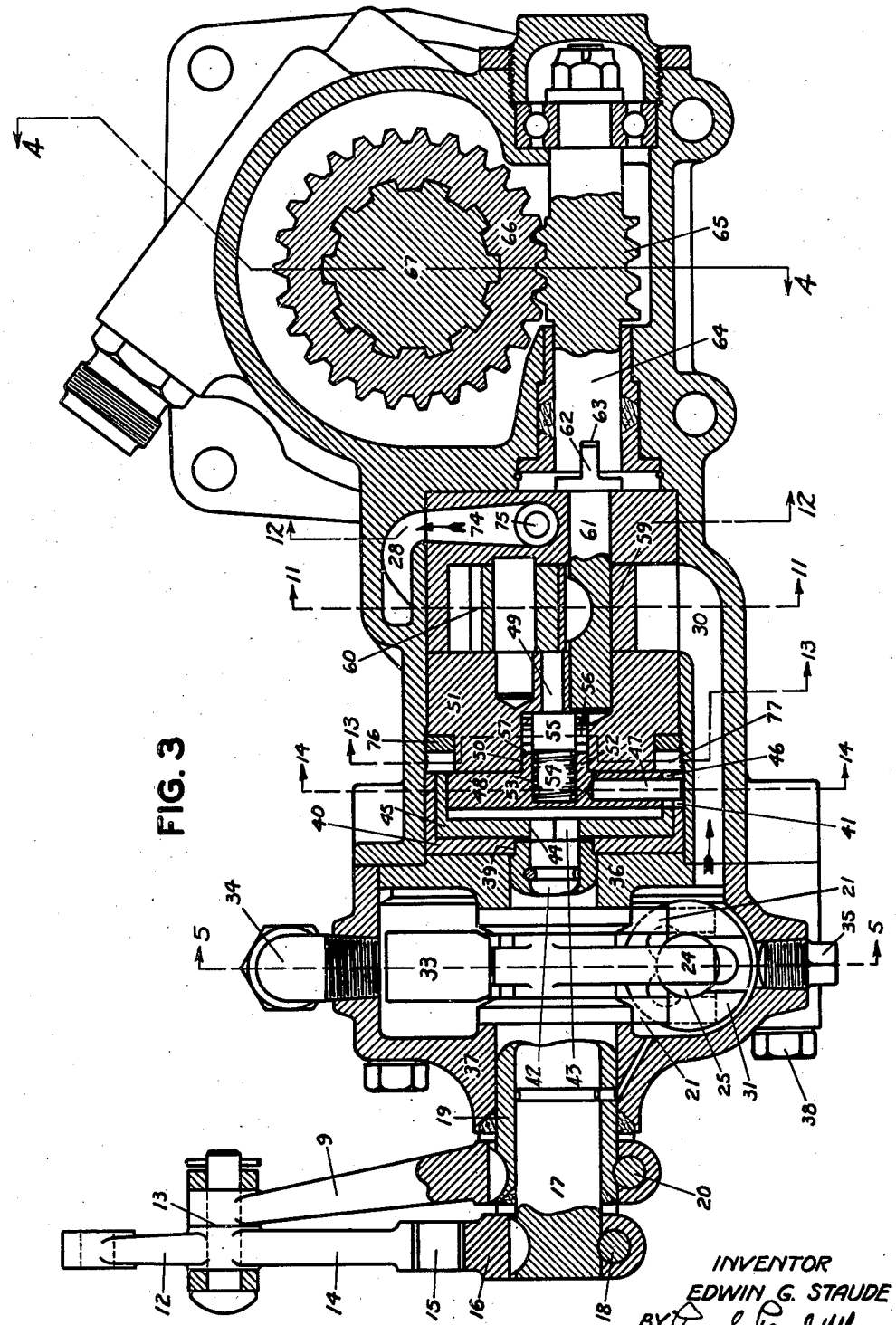
Figure 3 is a vertical longitudinal section of the braking power amplifier unit, illustrating the assembly, and the manner of arranging for a power take-off for the pump from an automobile transmission shaft.
Figure 14:
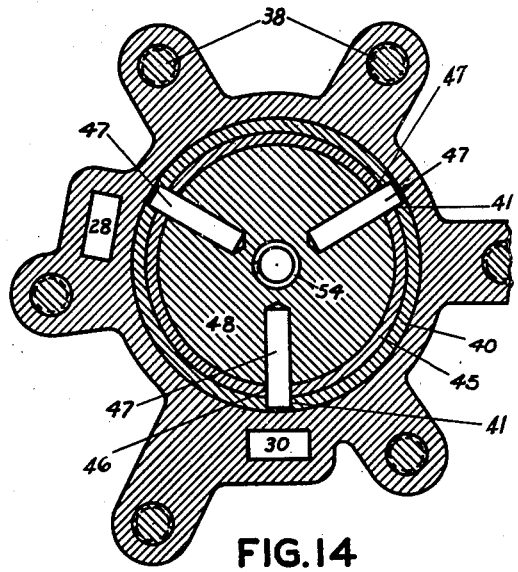

Figure 14 is a transverse section on line 14—14 of Figure 3, illustrating the means by which the volume control element is translated axially as the result of rotative motions of the control members; and Figure 15 is a vertical section on line 15—15 of Figure 10, further illustrating the relation of the plunger to the by-pass slot of the volume control device, with the position of the pump gears indicated in dot-and-dash lines, and showing their relation to the volume control plunger.

In the drawings, a conventional brake device is indicated, and consists of a drum 5, a brake band 6, a bellcrank lever 7, and a brake rod 8. The brake rod 8 is connected to the brake rod arm 9 of a power amplifier, generally indicated at 10. The brake pedal 4 is connected by a rod 11 to the brake pedal arm 12 on the power amplifier 10, and is kept in a raised or "out" position by a suitable retractor spring 11ª. The brake pedal arm 12 is pivoted at 13, which is also the point of connection for the brake rod 8. The arm 12 has a projecting member 14 having a gear tooth connection 15 with the arm 16 secured to the shaft 17 by the usual key and clamp bolt 18. The arm 9 is secured to the sleeve 19 by the key and clamp bolt 20.

Integral with the sleeve 19 are radial arms 21 (see Figures 3, 5, and 6) the ends of which pivotally operate in suitable recesses of outstanding portions of the piston 31, which piston 31 slides in cylinder 32 of casing 37. Fitted over the five-sided portion 22 (see Figure 5) of the shaft 17 is a member 23 having an arm 24 adapted to bear against a ball 25 which closes against a seat 26 at the end of the passage 27 of the piston 31. The passage 27 communicates with the inlet port 28 of the pump. Fluid delivered from port 27 passes around the ball (when the ball is unseated) through the passage 29 provided by counter-turning, and thence out through port 30 shown in dotted lines in Figures 5 and 6 and in full lines in Figure 3. A suitable spring 33 is provided to hold the member 24 in the position shown in Figure 5. The fluid within the circuit is automatically replenished from the motor fluid circuit by a pipe connection 34. A drain plug 35 is provided to permit draining of the fluid when desired.

The sleeve 19 (see Figure 3) having the arm 21, has a bearing in the member 36, and in the cap or cover 37, which cap is held in fluid tight position by suitable cap screws at points 38. The member 21 oscillates between the members 36 and 37. The inner end 39 of the sleeve 19 has a hexagonal outer surface, see Figure 8, adapted to receive the correspondingly shaped opening of the member 40 with a reasonably tight fit, so the member 40 will have precisely the same rotary movement as the sleeve 19. The member 40 has slots 41, substantially parallel with the rotative axis of the sleeve 19. The inner end of the shaft 17 has a reduced portion 42 and a square portion 43. The square portion 43 is pressed into a similar square hole 44 in the member 45. The member 45 has slots 46 corresponding in number to the slots 41 in the member 40. The slots 46 are spirally arranged preferably at an angle of 45 degrees to the slots 41. Slots 41, and 46, of which there are three, equally spaced apart, see Figure 14, receive corresponding pins 47 held in rotative member 48.

Since member 45 is secured for rotation with the shaft 17 by means of the squared opening 44, it has the same motion as arm 16. The element 40, on the other hand, moves with the sleeve 19 and the arm 9. Because of the relation of the pins to both slots 46 and 41, differential degrees of rotation of elements 17—19 results in translative motion of the member 48 and, therefore, corresponding motion of the volume control element 49. The degree of motion depends upon the ratios of the degrees of movement between the members 17 and 19. The degree of motion will be proportional to the difference in the position of the arms 21—23, respectively as shown in Figures 5 and 6, and thus the volume control plunger 49 moves to the "in" position shown in Figure 10 when the brakes are applied, and moves to the "out" position of Figure 9 when the brakes are released.

Figure 13:
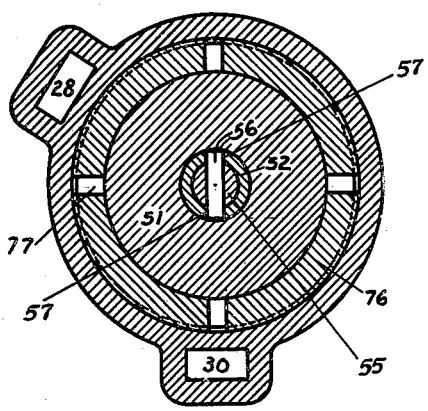
Figure 13 is a vertical section on line 13—13 of Figure 3, illustrating the method for locking the gear pump unit, and showing the connection between the volume control plunger, and one of its operating elements.

The member 48 (see Figures 3 and 8) which carries the pins 47 has a hub 52 which is rotative in a bearing bore 50 in the pump unit 51. The member 48 is provided with a recess 53 which passes through the hub, and in this recess is a spring 54 bearing against the head 55 of the volume control plunger 49. Pin 56, see Figures 3 and 13, passes through the head 55 of the plunger, and has its opposite end projecting into slots 57 of the hub 52. This arrangement permits translation of the plunger 49 so that it may move, as best shown in Figures 9 and 10. When the element 48 moves outwardly, the plunger 49 is positively retracted to "open" position as shown in Figure 9. When the element 48 moves in the opposite direction to the position shown in Figures 3 and 10, the plunger is moved to "closed" position and is held in that position, yieldably by means of the spring 54. The purpose of the spring is to permit the plunger to have a limited lateral movement when under maximum pressure or when the pump is operating at full pressure, the movement being limited by the spring 54 which is properly tensioned at the time of installation. A by-pass pressure relief is thus provided for, operative when the pump pressure exceeds some predetermined maximum. The arrangement also facilitates assembly, since proper assembly will always be made so long as the head 55 of the plunger seats against the inner end of the bore 50 of the member 51 and so long as the pin 56 does not (see Figure 10) engage the right end of the slot 57.

In order to provide a quick by-pass from exhaust to intake side of the pump when the plunger 49 is positioned as in Figure 9, a slot 58 is provided which is slightly less in width than the length of the diameter of the plunger, so that when the plunger is in the position shown in Figure 9 (which corresponds to the position of the members 21 and 24 in Figure 5) most of the fluid will flow laterally around the pump gears 59 and 60 from exhaust to intake side, instead of going around the circuit including the ports 28 and 30.

The gears are so associated with the chamber which contains them as to provide the usual pumping seal for such gears so that the liquid only passes from the intake to the outlet side when the gears are operated. The slot and the plunger therefor constitute means for making or breaking the seal.

The pump gear 59 is the driving gear, see Figure 3, and its shaft 61 has a flat-sided extension 62, fitting into the recess 63 of the worm drive shaft 64, thus forming a detachable drive connection. A worm 65 of shaft 64 is driven from the worm wheel 66 secured on the transmission shaft 67. The worm wheel 66 may also be provided with worm 68 to provide a power take-off 69 for the usual speedometer connection, see Figure 4.

Referring to Figure 10, when the plunger 49 is in seal-maintaining position, and when members 21 and 24 have assumed the position shown in Figure 6, pressure is instantly built up on the exhaust side and exerts a pressure against one side of the plunger 49. To partially equalize this pressure, a flat surface 70 is provided on the opposite side of the plunger, as shown, and a small passage 71 connects this cut-out with the exhaust side. The passage 71 communicates with the slot 58, and this pressure is partially equalized on both sides of the plunger 49 without by-passing to the intake side.

Figure 12:
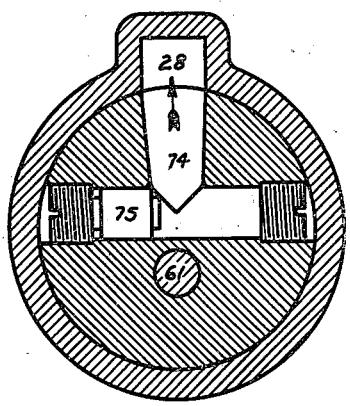
Figure 12 is a section on line 12—12 of Figure 3 showing means by which fluid flow is kept constantly in the same direction, regardless of direction of rotation of the pump gears, to provide braking amplifying power when the automobile is moving backwardly.
Figure 11:
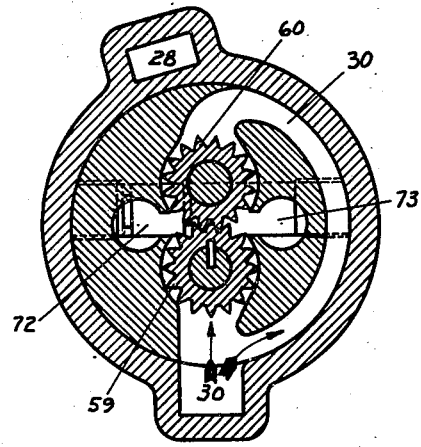
Figure 11 is a vertical cross-section on line 11—11 of Figure 3 illustrating the relation of the pump gears to the intake and exhaust ports.

Figure 11 illustrates a construction by which fluid is supplied to the pump gears 59 and 60 from the port 30. When the gear 59 rotates in clockwise direction, the exhaust will take place at 72, and when it rotates in counter-clockwise direction, exhaust will take place at 73. Thus power can be had whatever the direction of motion of an automobile on which the device is used. Pressure through either 72 or 73 communicates to the port 74, see Figure 12. A plunger 75 operated by pressure from either port 72 or 73 serves to cut off the other, so that the pressure from the pump gears 59 and 60 operated in either direction will be automatically directed into the port 74 which, in turn, communicates with the port 28 thus completing the circuit. This is a valuable feature.

In this brake power amplifier, the pump unit 51 is separately formed and is inserted within the casing 10, and is secured by threaded rings 76 (see Figure 3). The rings 76 have suitable slots 77 so that they may be tightened by a spanner wrench. The ring 76 also serves to keep the members 40 and 45 in position. The entire mechanism runs in oil, and all seepage is, of course, drained to the low pressure or intake side.

As shown in the drawings, the operating means for this fluid volume control are connected directly to the power amplifying control levers in such a way that the full fluid volume comes on instantly before the circulation can be obstructed to obtain pressure, as is perfectly clear from the construction shown.

The present invention is a very important one, because it is simple and inexpensive, and a much larger pump can be used for quick action when required, which large pump, without this invention, would quickly overheat unless provided with expensive, elaborate cooling equipment. Moreover, it would require a large amount of power for driving same at high car speeds when volume is not required.

Although the construction by which the plunger 49 is operated conformably to the condition of the brake power amplifying means is claimed, there is no intention to limit the broader aspects of the invention entirely thereto.

*Operation*

When the control connections are positioned as shown in full lines in Figure 2, and as in Figure 5, fluid from the pump gears (see Figure 11) is permitted to flow freely out through the port 73 into 28 (see Figure 12) out from 28 (see Figure 5) through passage 27 between ball 25 and seat 26 through the port 29, and back into the port 30 (see Figure 3 and Figure 11) which completes the circuit. When the arm 12 is in the position shown in full lines in Figure 2, the volume control plunger 49 is in the "open" position shown in Figure 9. When in this position, although the fluid is free to flow through the passages hereinbefore mentioned, that is out through the passage 28 and back through the passage 30, the largest percentage of the fluid flows from the port 73 to the port 72 (see Figure 11) through the passage 58, and out around the gears 59 and 60 into the chamber 30 (see Figures 9 and 15). It is, therefore, impossible for the pump gears to build up any pressure, regardless of their rotative speed in either direction, so long as the passages between 72 and 73 are connected by the passage 58.

Directly, however, that the plunger 49 is moved to the position shown in Figure 10, as a result, for example, of depressing the pedal 4 in order to set the brake, the flow of the fluid through the passage 58 between the ports 72 and 73 is positively stopped. This result is accomplished by the control as follows: On depression of the pedal, arm 12 is instantly moved into the position shown in dotted lines in Figure 2, and lever 16 is rocked to the dotted position shown in the same figure and causes a differential movement between the members 17 and 19 (as hereinbefore mentioned) which differential movement causes a corresponding differential movement between the members 40 and 45, see Figures 3 and 8. Since the members 40 and 45 are provided with slots 41 and 46 which are arranged tangent to each other, and since pins 47 traverse the slots 41 and 46, it follows that element 48 is axially translated to correspondingly move the plunger 49 into the position shown in Figure 10, to cut off the flow of the fluid through the passage 58 from the port 73 to the port 72, and thus instantly conditioning the pump for full power action. When this occurs, the pressure instantly builds up in the passage 28, because as the pedal 4 is depressed, member 22, see Figure 6, is rotated, and with it the member 23. Projection 24 causes ball 25 to partially seat at 26, thereby obstructing the passage of the fluid through the passage 27 in the piston 31. With this obstruction, pressure is instantly built up back of the piston member 31 and it moves to the position shown in Figure 6, which results, in this application of the invention, in assisting setting of the brakes, see Figure 1.

It is obvious that, as the pressure acts to move the piston 31, the pressure is exerted against the ball valve 25 and against the members 24, 23, 22, 17, 16, 14, and 12, and through them by the rod 11 to the brake pedal 4. The amount of this pressure is, of course, in direct proportion to the ratio of the exposed area of the ball 25 to that of the area of the piston 31, and, therefore, the ratios of these exposed areas will determine the amount of so-called "back pressure" needed against the brake pedal, to produce the necessary "feel" at the brake pedal to enable the operator to make a judgment as to the amount of manual braking effort required.

In practice, it is found that the maximum fluid pressure that may easily be obtained to get the maximum brake amplifying power is about five hundred pounds. This is determined by the tension of the spring 54, see Figure 3, against the head 55, because as pressure builds up on the discharge side of the pump gears, it will have a tendency to force the plunger 49 into the inactive or inefficient position which would cause a by-pass at maximum pressures, from the chamber 73 to the chamber 72.

When reversing the pump, as for instance when backing up the vehicle, of course, the by-pass is reversed (from the chamber 72 to the chamber 73) without affecting the normal flow of the circuit. Although the details of construction are claimed, as representative of a practicable device for carrying out the principle of my invention, I do not limit my invention to the precise construction shown, since it is readily apparent that the mechanical means for varying the pumping volume may be altered considerably without departing from the spirit of the invention.

I claim as my invention:

1. A pump having gears and a pumping seal therefor, means cooperating with the seal yieldable against maximum pumping pressure and operative at the meshing point of the gears for normally breaking the pump seal, and manually operated means controlling said yielding means to restore the seal.

2. A pump having gears and a pumping seal therefor, said pump having a stationary casing, a brake pedal, a reciprocable valve member yieldable to liquid pressure, reciprocable in the casing and operable at the meshing point of the gears for breaking the pumping seal, and connections between said reciprocable member and the pedal, whereby depression of said pedal to apply the brake moves said valve member to restore the seal.

3. A pump having gears and a pumping seal therefor, said pump having a stationary casing, a spring tensioned valve member yieldable to liquid pressure, reciprocable in the casing and operable at the meshing point and against the side faces of the gears for breaking the pumping seal, and connections for said reciprocating valve member with a brake pedal, whereby depression of said pedal to apply the brakes moves said valve to re-establish the seal.

4. A gear pump having a stationary casing and pumping gears therein, a passage in the casing at the level of the meshing points of the gears and connecting the exhaust side with the intake side of said pump, and a reciprocable valve yieldable to liquid pressure adapted to obstruct the flow of the fluid through said passage and means for controlling said reciprocating valve.

5. A gear pump, translative means operative at the meshing point of the gears to vary the force of pumping action, controlling means including two elements separately rotatable, and means by which rotative motions of said last mentioned means obtains translative motions of said translative means.

6. A gear pump, translative means yieldable to liquid pressure operative at the meshing point of the gears to vary the force of pumping action, rotative controlling means, and means by which the rotative motion of said last mentioned means obtains translative motion of said translative means.

7. A pump having gears and a pumping seal therefor, means cooperating with the seal movable independently of and with respect to the gears at the meshing point for alternately establishing and breaking the pump seal, a brake pedal and control means yieldable to liquid pressure by which reverse motions thereof operate said seal making and breaking means respectively to break and establish the seal.

8. A gear pump, a passage connecting the exhaust side with the intake side of the pump at the level of the meshing point of the gears, a reciprocable element yieldable to liquid pressure operating across the passage and adapted to abuttingly engage the sides of the gears at the meshing point of the gears.

9. A gear pump, a passage connecting the exhaust side with the intake side of the pump at the level of the meshing point of the gears, a reciprocable element yieldable to liquid pressure operating across the passage and adapted to abuttingly engage the sides of the gears at the meshing point of the gears, the area of abutment being equal or slightly greater than the depth of the teeth.

10. In combination with an automobile having a manual actuator a control mechanism, and means for amplifying pressure applied thereby including a pump having gears and a pumping seal therefor, means yieldable to liquid pressure movable at the meshing points of the gears for breaking and making the pump seal, and means by which motions of the manual actuator move the last mentioned means to establish the seal.

11. In combination with an automobile having a brake pedal, a brake, and means for amplifying braking pressure including a pump having gears and a pumping seal therefor, means yieldable to liquid pressure movable at the meshing points of the gears for breaking and making the pump seal and means by which motions of the brake pedal in braking direction moves the last mentioned means to establish the seal before the gears are rotated for their power-amplifying action.

12. A power amplifying unit comprising a fluid pump having a pumping seal and means yieldable to liquid pressure for breaking the pump seal to render the pump ineffective, means operable in the fluid circuit to transmit power when moved by the fluid, valve means in the circuit and means by which it is controlled to set up pressure against the power transmitting means, and means by which operation of the two last mentioned means to obtain power amplification operates said seal breaking means to establish the seal.

13. A power amplifying unit comprising a fluid pump having a pumping seal and means yieldable to liquid pressure for breaking the pump seal to render the pump ineffective, means operable in the fluid circuit to transmit power when moved by the fluid, valve means in the circuit and means by which it is controlled to set up pressure against the power transmitting means, and means by which the combined operation of the two last mentioned means to obtain power amplification operates said seal breaking means to establish the seal.

14. A power amplifying unit comprising a fluid pump having a pumping seal and means yieldable to liquid pressure for breaking the pump seal to render the pump ineffective, means operable in the fluid circuit to transmit power when moved by the fluid, valve means in the circuit and means by which it is controlled to set up pressure against the power transmitting means, and means by which operation of the two last mentioned means to obtain power amplification operates said seal breaking means to establish the seal, including means acting to break the seal when the power amplifying action ceases.

15. A unit including a case having a tubular extension and a drive shaft, a pump unit detachably fitting said tubular extension and having pump gears and a pumping seal therefor and a gear driving shaft detachably coupled with said first mentioned shaft, means yieldable to liquid pressure supported on the pump unit and movable with respect to the gears for making and breaking the pump seal, a cover for the tubular extension having journaled therein a pair of concentric shafts, means by which differential degrees of rotation of the shafts are obtainable, means detachably arranged in said extension for operating the seal-making and breaking means including two cooperating elements, means by which each shaft controls one of said elements, and means operable by said concentric shafts for obstructing fluid flow to obtain a reaction which moves one of the shafts when the other is manually moved.

16. In a power amplifying system a control element, means to which power is to be applied, a pump having a seal, a fluid circuit for the pump, means yieldable to liquid pressure by which the fluid controls application of power to the power-applicable means, for controlling the pump seal, and means by which the control element controls the last mentioned means to establish the seal and initiate pumping action when said control element is moved in a direction to obtain power application.

17. In a power amplifying system a control element, means to which power is to be applied, a pump having a seal, a fluid circuit for the pump, means yieldable to liquid pressure by which the fluid circuit controls application of power to the power-applicable means, for controlling the pump seal, and means by which the control element controls the last mentioned means to progressively establish the seal and initiate pumping action when said control element is moved in a direction to obtain power application.

18. In a power amplifying system, a control element, means to which power is to be applied, a pump having a seal, means for controlling the seal for varying pumping volume conformably to power requirements, means by which the pump controls application of power to said power-applicable means, and means by which the control element so operates the pump-volume-varying means as to increase the volume when said control element is moved in direction to obtain power application, and vice versa.

19. In a power amplifying system, a control element, means to which power is to be applied, a gear pump, means for varying pumping volume conformably to power requirements by by-passing fluid at the meshing point of the gears, means by which the pump controls application of power to said power-applicable means, and means by which the control element so operates the pump-volume-varying means as to prevent said by-passing when said control element is moved in direction to obtain power application, and vice versa.

20. A dual brake power amplifying mechanism for motor cars having, a brake pedal, a source of fluid power, a piston against which said power acts, valve and valve seat mechanism for controlling the flow or pressure of said fluid power, said valve seat being mounted in said piston, a valve rockshaft, a piston rockshaft, said valve being controlled by an arm mounted on said valve rock shaft, another arm bearing against the piston and mounted on the piston rock shaft which telescopes with the valve rock shaft, an arm mounted on the piston rock shaft, connections at the outer end of said arm for a brake rod connection, and another arm, one end of which is operatively connected to the brake pedal and the opposite end to an arm mounted on the valve rock shaft.

21. In a dual brake power amplifying system for motor cars, a brake pedal, a source of fluid power, a piston against which said power acts, said piston having a passage therethrough having a valve seat, a valve rock shaft having means thereon controlling a valve for said seat, a piston rock shaft coupled with the valve shaft for relative yielding as to the valve shaft having an arm engaged with and movable by the piston, connections by which the piston rock shaft can operate a brake, and means on the valve rock shaft for connecting it with a brake pedal.

22. In a dual power brake amplifying mechanism for motor cars, a brake pedal, a source of fluid power, a piston against which said power acts, said piston having a passage therethrough, a ball valve for controlling said passage, a first rock shaft having an arm by which it controls the valve to control flow through the passage, a second rock shaft telescoping with the first coupled with the valve shaft for relative yielding as to the valve shaft and having an arm engaged with and moved by the piston, and means by which one shaft is controlled to control the other by means of said piston and valve.

23. A device of the class described comprising a pump including fluid circulating passages, a piston in the passages against which the fluid power acts, said piston having a passage through which the fluid can flow from one side to the other, a ball valve for controlling flow through the passage, means for controlling the ball valve, means movable by the power action of the piston, and means connecting said last two mentioned means respectively to a pedal and to a mechanism to be controlled, including an arm for each means and a fulcruming connection between the arms for obtaining differential motions therebetween.

24. A device of the class described comprising a pump including a fluid circuit, a piston in the circuit against which the power acts, said piston having a passage through which the fluid can flow from one side of the piston to the other, a ball valve for controlling flow through the passage, a pair of concentric rock shafts one having an arm for controlling the ball and another having an arm movable by the piston, means by which the shafts can be coupled respectively to a prime mover also to each other for relative yielding between them and to a mechanism to be moved.

25. A device of the class described comprising a pump including a fluid circuit, a piston in the circuit against which the power acts, said piston having a passage through which the fluid can flow from one side of the piston to the other, a ball valve for controlling flow through the passage, a pair of concentric rock shafts one having an arm engaging and controlling the ball and another having an arm engaged with and movable by the piston, means by which the shafts can be coupled respectively to a prime mover also to each other for relative yielding between them and to a mechanism to be moved and a connection for obtaining differential rotative motions of the shafts.

26. In combination with an automobile having a brake pedal and a brake, a first shaft having an arm for operating the brake, a lever pivoted on the arm and operated by the brake pedal, a second shaft, means by which the lever moves the shaft, a fluid pressure system including a pump having a pump seal, means cooperating with the seal by which the second shaft blocks fluid to set up pressure in the system, means against which the pressure acts as a result of such blocking and adapted to move the first shaft to apply the brake, means for controlling the pumping seal to make or break it, and means operable as a result of movement of the second shaft to cause said pump seal control means to establish the pumping seal.

27. In combination with an automobile having a brake pedal and a brake, a first shaft having an arm for operating the brake, a lever pivoted on the arm and operated by the brake pedal, a second shaft, means by which the lever moves the shaft, a fluid pressure system including a pump having a pump seal, means cooperating with the seal by which the second shaft blocks fluid to set up pressure in the system, means against which the pressure acts as a result of such blocking and adapted to move the first shaft to apply the brake, means for controlling the pumping seal to make or break it and means operable as a result of movement of the second shaft to cause said pump seal control means to establish the pumping seal, and means for constantly operating the pump.

28. In a power unit for motor car controls, a valve yieldable to liquid pressure for controlling pressure and a gear pump adapted to pump fluid against the pressure, a bypass connecting the discharge and intake sides of the pump at the level of the meshing points of the gears, and pressure controlled means operable in said passage and against the gear faces for regulating the volume of the liquid bypassed.

29. In a fluid power actuator mechanism, a device to be controlled, power input controlling means, a power output member and linkage means by which it actuates the device to be controlled including a pivoted part, means for generating fluid pressure, said output member including a piston against which pressure acts, an operating chamber for said piston, a fluid passage through said piston and a valve for controlling pressure through said passage, a valve operating linkage controlled by said input controlling means, including means for causing a part of the input effort to be applied for operating said valve and a part applied for operating said device to be controlled, said valve being operated by the input controlling means through said valve operating linkage, said linkage including a valve arm bearing against said valve and pivoted substantially concentrically with said pivoted part of the output actuating member linkage means, said output member linkage means including an arm bearing against said piston, and said valve arm being located near the output linkage arm.

30. In a fluid power actuator mechanism, a device to be controlled, power input controlling means, a power output member and linkage means by which it actuates the device to be controlled including a pivoted part, means for generating fluid pressure, a high pressure chamber, a low pressure chamber and an operating chamber connecting said chambers, a piston slidably mounted in said operating chamber, a fluid passage through said piston, a valve for controlling pressure through said fluid passage, a valve operating linkage controlled by said input controlling means, including means for causing a part of the input effort to be applied for operating said valve and a part applied for operating said device to be controlled, said valve operating linkage including a valve arm bearing against said valve and pivoted substantially concentrically with said pivoted part of the power output member linkage means, said power output member linkage means also including an arm bearing against said piston, with said valve arm located near the output linkage arm and said valve arm being mounted in said low pressure chamber.

31. In a fluid power actuator mechanism, a device to be controlled, power input controlling means, a power output member and linkage means by which it actuates the device to be controlled including a pivoted part, means for generating fluid pressure, a high pressure chamber, a low pressure chamber and an operating chamber connecting said chambers, a piston slidably mounted in said operating chamber, a fluid passage through said piston, a valve operated by said power input controlling means for controlling pressure through said fluid passage, said power input controlling means including a valve arm bearing against said valve, and pivoted substantially concentrically with the pivoted part of said power output member linkage means, said power output member linkage means including an arm bearing against said piston, with the said valve arm located near the output linkage arm, said output linkage arm and said valve arm being mounted in the low fluid pressure chamber, and a closure for said low fluid pressure chamber.

32. In a fluid power actuator mechanism, a device to be controlled, power input controlling means, a power output member and linkage means by which it actuates the device to be controlled including a pivoted part, means for generating fluid pressure, a high pressure chamber, a low pressure chamber and an operating chamber connecting said chambers, a piston slidably mounted in said operating chamber, a fluid passage through said piston, a valve operated by said power input controlling means for controlling pressure through said fluid passage, said power input controlling means including a valve arm bearing against said valve and pivoted substantially concentrically with said pivoted part of said power output member linkage means, said power output member linkage means including an arm bearing against said piston, and the said valve arm being located near the output linkage arm, and said valve arm being mounted in the low pressure chamber, a closure for said low pressure chamber, and a fluid passage connecting said low pressure chamber with the intake side of said means for generating fluid pressure.

33. In a fluid power actuator mechanism, a device to be controlled, power input controlling means, a power output member and linkage means by which it actuates the device to be controlled including a pivoted part, means for generating fluid pressure, a high pressure chamber, a low pressure chamber and an operating chamber connecting said chambers, a piston slidably mounted in said operating chamber, a fluid passage through said piston, a valve operated by said power input controlling means for controlling pressure through said fluid passage, said power input controlling means including a valve arm bearing against said valve and pivoted substantially concentrically with said pivoted part of said power output member linkage means, said power output member linkage means including an arm bearing against said piston, said valve arm being located near the output linkage arm, said output linkage arm and said valve arm being mounted in the low fluid pressure chamber, a closure for said low fluid pressure chamber, a fluid passage connecting said low pressure chamber with the intake side of the means for generating fluid pressure, and a spring connecting said valve arm and said two-fingered yoke for the purpose set forth.

34. In a fluid power actuator mechanism, a fluid pressure system and means for generating fluid pressure therein, a piston movable in said system, and having a passage as part of said system, a valve for controlling said passage, a power output member having a fork the arms of which are engaged with and moved by said piston, a power input member having an arm lying between the arms of the forks and adapted to move and to be moved by said valve, and linkage connections for said input and output members for operating said input member to control the valve and for transmitting power resultant from piston movement.

35. In a fluid power actuator mechanism, a fluid pressure system and means for generating fluid pressure therein, a piston movable in said system and having a passage as part of said system, a valve for controlling said passage, a power output member having a fork the arms of which are engaged with and moved by said piston, a power input member having an arm lying between the arms of the forks and adapted to move and to be moved by said valve, and linkage connections for said input and output members for operating said input member to control the valve and for transmitting power resultant from piston movement on closure of said valve, said input and output members being concentrically pivotally related.

36. A power amplifying device including a gear pump having a casing, means located at the level of the meshing point of the gears for controlling full volume by passing of liquid around the gears including a short by-passage connecting the intake and discharge sides of the pump and a plunger for controlling said passage by movement toward and away from the side faces of the gears, and a pedal for controlling said last mentioned means, by which initiation of the power amplifying operation by the pedal prevents by-passing for obtaining full pumping pressure, and by which the by-passage controlling means reacts against force applied to the pedal to obtain pedal "feel".

EDWIN G. STAUDE.